(12) United States Patent
Nakano et al.

(10) Patent No.: US 7,721,672 B2
(45) Date of Patent: May 25, 2010

(54) ELECTRICALLY ILLUMINATING INDICATOR NEEDLE AND LIGHT GUIDING MEMBER

(75) Inventors: Koji Nakano, Komatsushima (JP); Hitoshi Nojiri, Anan (JP); Ryosuke Wakaki, Anan (JP)

(73) Assignee: Nichia Corporation, Anan-Shi (JP)

( * ) Notice: Subject to any disclaimer, the term of this patent is extended or adjusted under 35 U.S.C. 154(b) by 73 days.

(21) Appl. No.: 11/918,866

(22) PCT Filed: Apr. 17, 2006

(86) PCT No.: PCT/JP2006/308061
§ 371 (c)(1),
(2), (4) Date: Oct. 19, 2007

(87) PCT Pub. No.: WO2006/115100
PCT Pub. Date: Nov. 2, 2006

(65) Prior Publication Data
US 2008/0210154 A1 Sep. 4, 2008

(30) Foreign Application Priority Data
Apr. 21, 2005 (JP) .............................. 2005-123308
Feb. 7, 2006 (JP) .............................. 2006-029957

(51) Int. Cl.
*G01D 11/28* (2006.01)
(52) U.S. Cl. .................. 116/288; 116/286; 362/27; 362/555
(58) Field of Classification Search ............... 116/281, 116/286, 287, 288; 362/27, 30, 309–310, 362/555, 558, 560; 40/546
See application file for complete search history.

(56) References Cited
U.S. PATENT DOCUMENTS

| 4,274,358 | A |   | 6/1981 | Nakamura et al. |
| 5,636,589 | A | * | 6/1997 | Kato et al. .................. 116/286 |
| 6,120,158 | A | * | 9/2000 | Ishimaru et al. ............... 362/26 |
| 6,305,813 | B1 | * | 10/2001 | Lekson et al. ............... 362/625 |
| 6,464,367 | B2 | * | 10/2002 | Ito et al. .................... 362/613 |
| 6,820,991 | B2 | * | 11/2004 | Wakaki et al. ................. 362/27 |
| 6,948,840 | B2 | * | 9/2005 | Grenda et al. ............... 362/555 |
| 7,191,730 | B2 | * | 3/2007 | Araki et al. .................. 116/288 |
| 2004/0004826 | A1 |   | 1/2004 | Wakaki et al. |

FOREIGN PATENT DOCUMENTS

| JP | 55-50638 Y2 | 11/1980 |
| JP | 58-13693 Y2 | 3/1983 |
| JP | 7-151567 A | 6/1995 |
| JP | 10-332438 A | 12/1998 |
| JP | 2000-213964 A | 8/2000 |
| WO | WO-02/093535 A | 11/2002 |

\* cited by examiner

*Primary Examiner*—R. A. Smith
*Assistant Examiner*—Tania C Courson
(74) *Attorney, Agent, or Firm*—Birch, Stewart, Kolasch & Birch, LLP

(57) ABSTRACT

An electrically illuminating indicator needle and a light guiding member therefor that allow such a control as length of the needle can be varied while undergoing less unevenness in luminance and can be manufactured at a lower cost are provided.

The electrically illuminating indicator needle comprises a plurality of planes of incidence, a plurality of light reflecting surfaces disposed to correspond to the planes of incidence so as to reflect light coming from the planes of incidence, a light guiding member disposed to correspond to the light reflecting surfaces so as to cause the light reflected on the light reflecting surfaces to emerge, and a plurality of light emitting diodes disposed to oppose the planes of incidence.

19 Claims, 9 Drawing Sheets

(a)

(b)

(c)

ELECTRICALLY ILLUMINATING INDICATOR NEEDLE AND LIGHT GUIDING MEMBER

FIELD OF THE INVENTION

The present invention relates to an electrically illuminating indicator needle and a light guiding member used, for example, in speedometer and tachometer of automobile or motorcycle.

BACKGROUND ART

For an electrically illuminating indicator needle used in a speedometer 700 (FIG. 9) of automobile or the like, there is an electrically illuminating indicator needle constituted from light emitting diodes disposed in a linear arrangement so that the meter is read by directly seeing light emitted by the light emitting diodes (refer to, for example, Japanese Unexamined Patent Publication No. 10-332438). The electrically illuminating indicator needle 600 disclosed in Japanese Unexamined Patent Publication No. 10-332438 has such a constitution as the light emitting diodes 611a through 611i are disposed in line as shown in FIG. 10 which are turned on to light up starting with the one located at one end toward the other end sequentially, so as to give an impression that the indicator varies its length to the viewer.

Patent Document
Japanese Unexamined Patent Publication No. 10-332438

DISCLOSURE OF THE INVENTION

Problem to be Solved by the Invention

The electrically illuminating indicator needle of the prior art which is read by directly seeing light emitted by the light emitting diode, however, has such a problem that uneven luminance may lead to the loss of continuity that disables it to provide ideal linear light source.

Accordingly, since it is necessary to mount the light emitting diodes with high density by making the space between the adjacent light emitting diodes smaller, it is difficult to manufacture at a low cost while wiring and control become complicated.

Accordingly, an object of the present invention is to provide an electrically illuminating indicator needle and a light guiding member therefor that allow such a control as length of the needle varies with less unevenness in luminance and can be manufactured at a lower cost.

Means for Solving Problem

The electrically illuminating indicator needle of the present invention that achieves the object described above comprises: a light guiding member having a plurality of planes of incidence, a plurality of light reflecting surfaces each of which is disposed to correspond one to one with the planes of incidence so as to reflect a light coming from the corresponding plane of incidence, a plurality of light emitting surfaces each of which is disposed to correspond one to one with the light reflecting surfaces so as to emit the light reflected on the corresponding light reflecting surface; and a plurality of light emitting diodes each of which is disposed to correspond one to one with the planes of incidence.

The light guiding member of the present invention comprises: a plurality of planes of incidence; a plurality of light reflecting surfaces each of which is disposed to correspond one to one with the planes of incidence so as to reflect a light coming from the corresponding plane of incidence; a plurality of emitting regions each of which is disposed to correspond one to one with the light reflecting surfaces so as to emit the light reflected on the corresponding light reflecting surface, wherein the emitting regions are disposed in line to form an indicator needle light emitting surface.

EFFECT OF THE INVENTION

The electrically illuminating indicator needle and the light guiding member of the present invention having constitutions described above allow such a control as the length of the needle varies with less unevenness in luminance and can be manufactured at a lower cost.

DESCRIPTION OF REFERENCE NUMERALS

Figure 1:
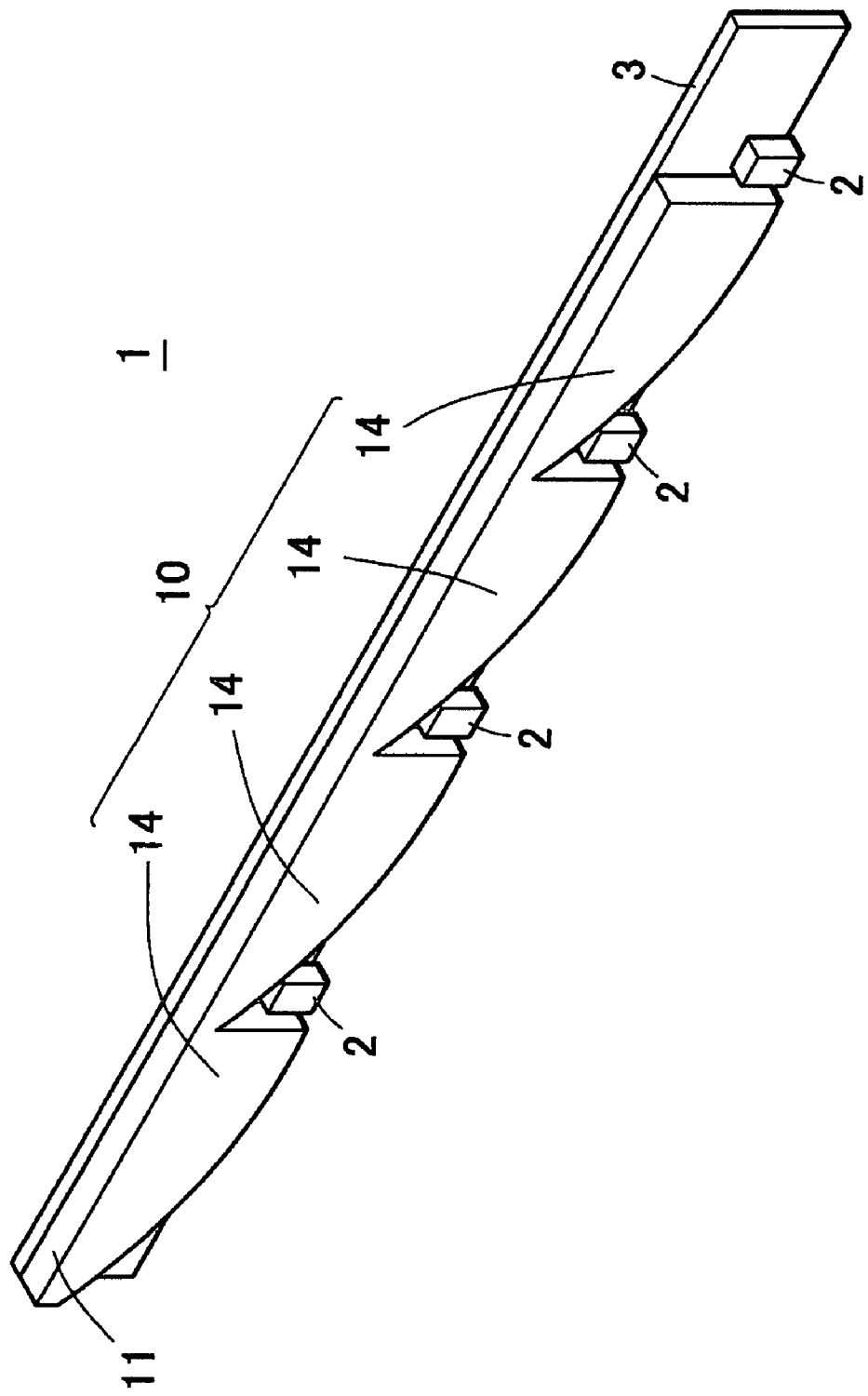
FIG. 1 is a perspective view showing the constitution of electrically illuminating indicator needle 1 according to first embodiment of the present invention.

1, 200, 300, 400: Electrically illuminating indicator needle
2, 111: Light emitting diode,
3: Needle substrate
10: Indicator needle light guiding member
11, 120c: Unit light emitting surface
12, 120a: Plane of incidence
13, 120b: Light reflecting surface
14, 121a: Unit light guiding portion
15: Indicator needle light emitting surface
111: Unit light emitting portion
121: Unit light guiding member
315: Diffusing member

MODE FOR CARRYING OUT THE INVENTION

Best forms of implementing the present invention will be described below by making reference to the accompanying drawings. It should be noted that the forms described below are merely for the purpose of exemplifying the use of the electrically illuminating indicator needle for implementing the concept of the present invention, and that the present invention does not limit the electrically illuminating indicator needle to the constitutions described below. The drawings may exaggerate the sizes and positional relationships of the members for the sake of ease of understanding.

FIRST EMBODIMENT

The electrically illuminating indicator needle 1 according to the embodiment of the present invention comprises an indicator needle substrate 3, a plurality of light emitting diodes 2 disposed on the indicator needle substrate, and an indicator needle light guiding member 10 having an indicator needle light emitting surface 15 of sufficiently large length in one direction.

Figure 9:
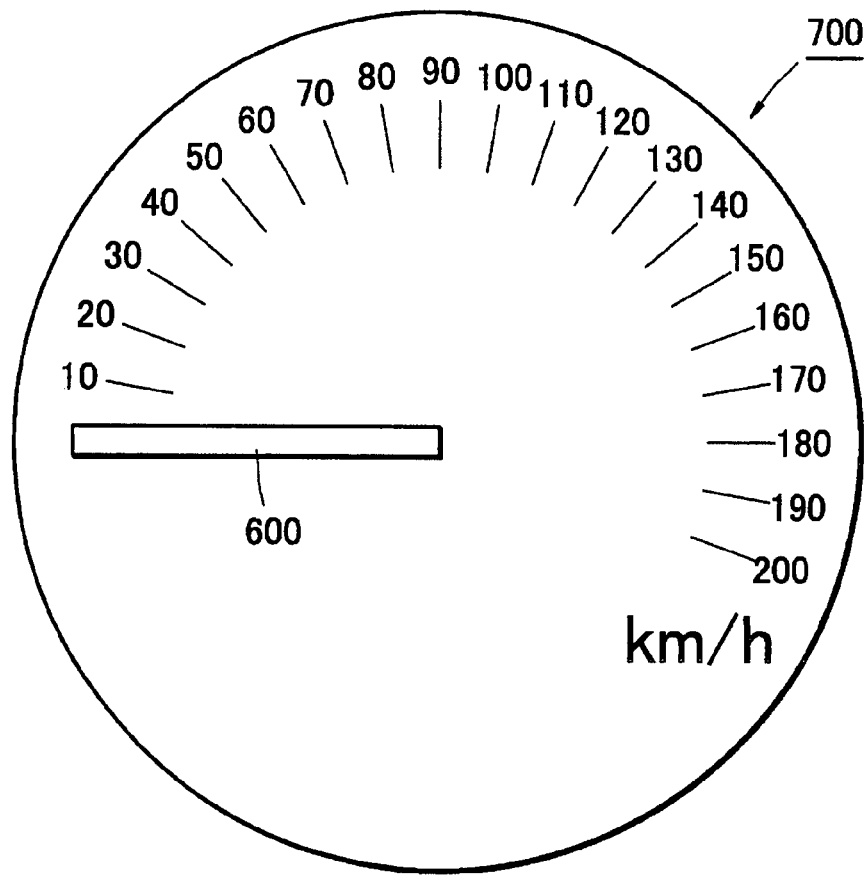
FIG. 9 is a plan view of a speedometer in which the electrically illuminating indicator needle is used.
Figure 10:
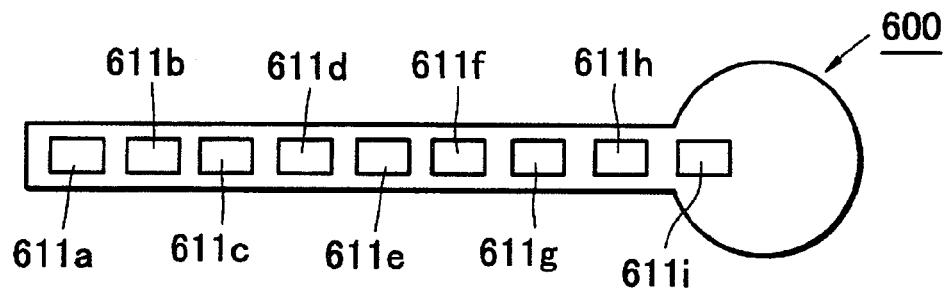
FIG. 10 is a plan view showing the constitution of electrically illuminating indicator needle of direct view type of the prior art.

The electrically illuminating indicator needle of the first embodiment is used, for example, in a speedometer as that shown in FIG. 9, where the electrically illuminating indicator needle rotates around the center of the speedometer so as to show the speed to the viewer.

The electrically illuminating indicator needle 1 of the first embodiment includes the indicator needle light guiding member 10 constituted so that a plurality of unit light guiding portions 14 having unit light emitting surfaces 11, planes of incidence 12 and light reflecting surfaces 13 are disposed by aligning the longitudinal directions thereof, and the light emitting surfaces of the light emitting diodes 2 are disposed so as to oppose the planes of incidence 12 of the unit light guiding portions 14.

The electrically illuminating indicator needle 1 of the first embodiment having the constitution described above can be controlled so that length of the needle varies by sequentially turning on the light emitting diodes 2 starting with the one at the end located at the center of the meter. Since the unit light guiding portions 14 are provided in correspondence to the light emitting diodes 2, unevenness in luminance can be eliminated when the light emitting diodes are directly seen.

The electrically illuminating indicator needle 1 of the first embodiment can also be manufactured with smaller number of light emitting diodes at a lower cost, since light emitted by each of the light emitting diode 2 is caused to emerge while being diffused by the corresponding unit light guiding portion 14.

The electrically illuminating indicator needle 1 according to the first embodiment of the present invention will now be described in detail.

Figure 2:
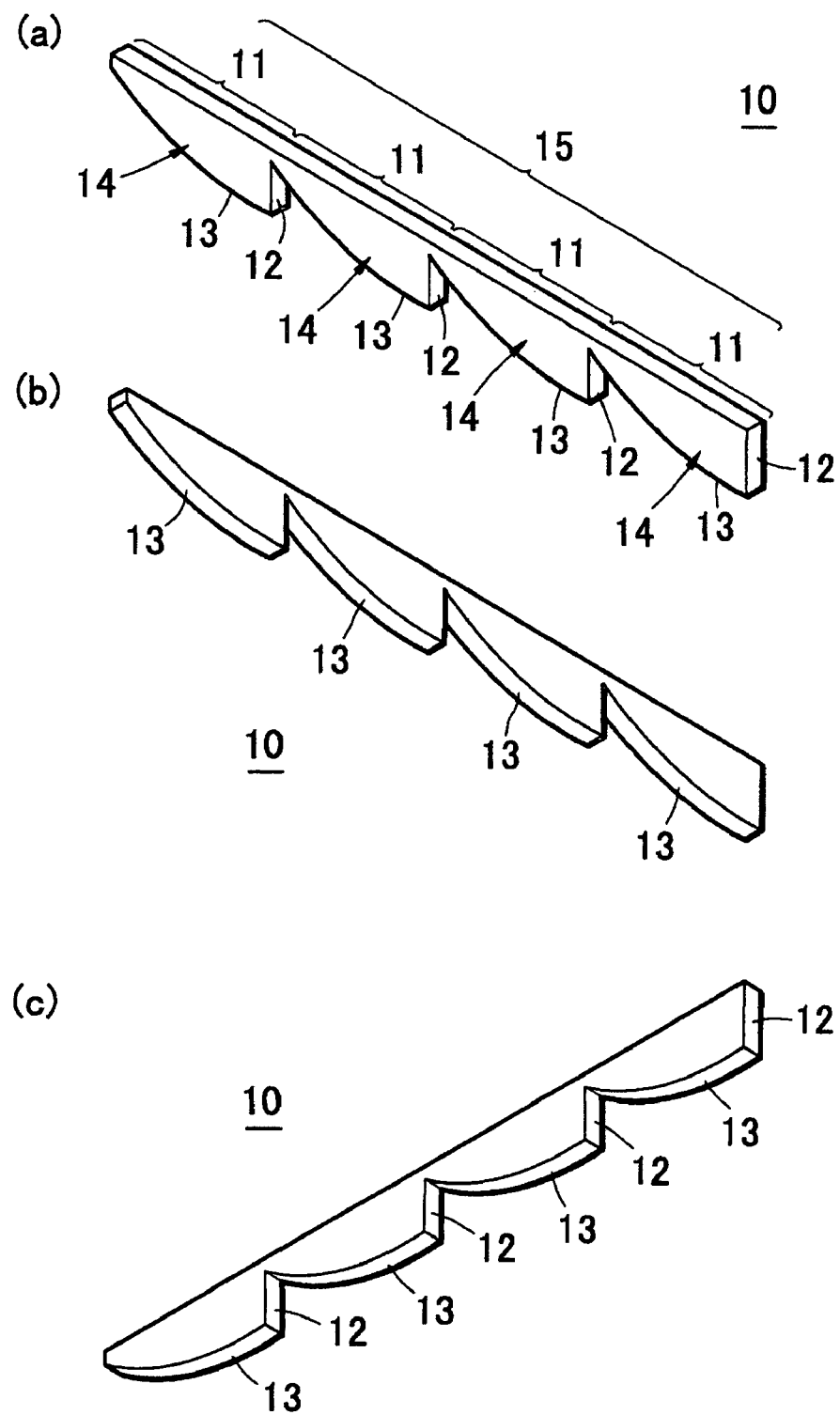
FIG. 2 is a perspective view showing the constitution of light guiding member 10 according to the first embodiment.

In the first embodiment, the indicator needle light guiding member 10 is an integrally molded piece constituted so that a plurality of the unit light guiding portions 14 having the unit light emitting surfaces 11, the planes of incidence 12 and the light reflecting surfaces 13 are disposed in line, while the indicator needle light emitting surface 15 of the indicator needle light guiding member 10 is formed by disposing the unit light guiding portions 14 in line with no discontinuity in the light emitting surface (FIG. 2(a)).

The unit light guiding portion 14 that constitute the indicator needle light guiding member 10 has the plane of incidence 12 upon which light from the light emitting diode 2 enters, the light reflecting surface 13 which reflects the light incident on the plane of incidence 12 toward the unit light emitting surface 11, and the unit light emitting surface 11 which causes the light reflected on the light reflecting surface 13 to emerge.

In the unit light guiding portion 14, the plane of incidence 12 is formed so as to be substantially perpendicular to the unit light emitting surface 11. The light reflecting surface 13 which reflects the light incident on the plane of incidence 12 toward the unit light emitting surface 11 is formed with such a shape and position that luminance of light from the unit light emitting surface 11 of the unit light guiding portion 14 becomes uniform.

Figure 3A:
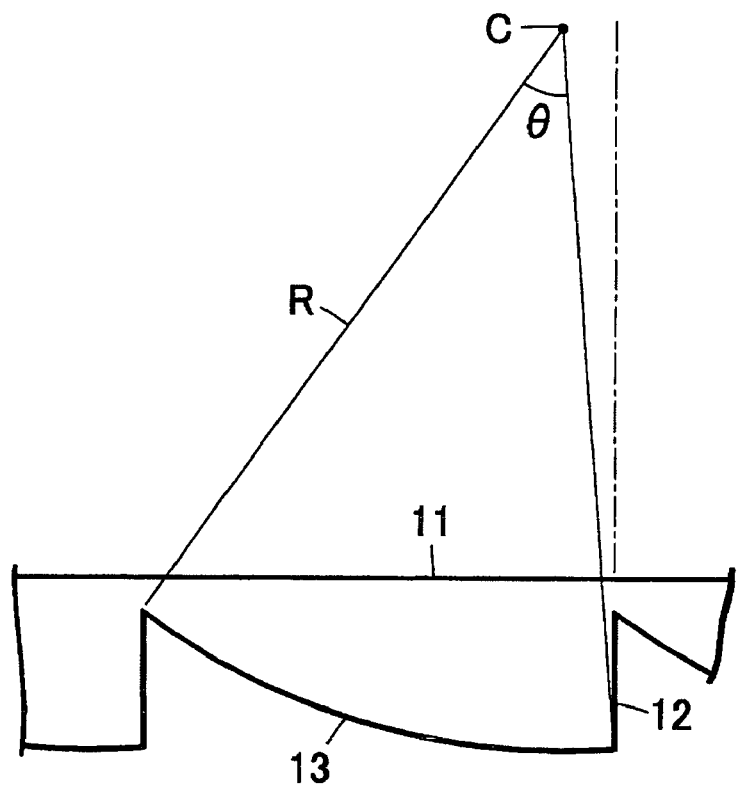
FIG. 3A is an enlarged side view of a portion of the light guiding member 10 according to the first embodiment.

That is, while the light emitting diode used as the light source has such a directivity of light emission that light intensity is high near the optical axis and becomes lower with the distance from the optical axis, the present invention achieves uniform distribution of luminance on the unit light emitting surface 11 through the design of the light reflecting surface 13 in the shape and position thereof, taking the directivity of light emission from the light emitting diode into consideration. In the unit light guiding portion 14 of the first embodiment, the light reflecting surface 13 is formed in an arc surface having radius R, center C and central angle θ (FIG. 3A) which are set so as to achieve uniform distribution of luminance on the unit light emitting surface 11 in consideration of directivity of light emission from the light emitting diode 2 and the position of the light emitting diode relative to the plane of incidence 12.

Figure 3B:
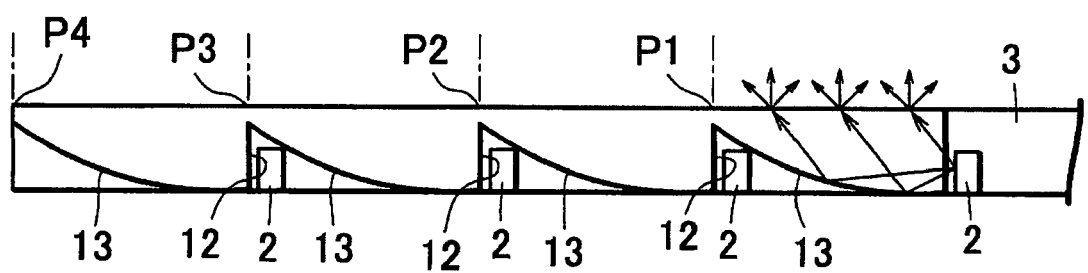
FIG. 3B is a side view showing the constitution of the electrically illuminating indicator needle 1 according to the first embodiment.

The light emitting diodes 2 are disposed relative to the unit light guiding portion 14 constituted as described above, so that the light emitting surface of the light emitting diode 2 opposes the plane of incidence 12 of the unit light guiding portion 14, as shown in FIG. 3B. With such a constitution, a part of light that has been emitted by the light emitting diode 2 and introduced through the plane of incidence 12 into the unit light guiding member 14 emerges directly from the light emitting surface 11 with the rest being reflected on the light reflecting surface 13 so as to emerge directly from the light emitting surface 11 while diffusing over the entire light emitting surface 11, and the intensity of emitted light, that is the sum of the former part and the latter part, is distributed uniformly over the entire unit light emitting surface 11.

The light emitting surface of the unit light guiding portion 14 is roughened in the first embodiment, and FIG. 3B shows the light being diffused by the rough surface and emerging.

While the electrically illuminating indicator needle 1 of the first embodiment may employ the light emitting diode 2 made of various semiconductor materials, it is preferable to use a light emitting diode of surface-mounted type which is relatively small in size, since the space available for mounting is limited.

In the electrically illuminating indicator needle 1 of the first embodiment constituted as described above, the light reflecting surface is adjusted so that the total intensity of the light reaching the light emitting surface 11 directly from the light emitting diode 2 and the light reaching the light emitting surface 11 after reflecting on the light reflecting surface 13 is uniformly distributed over the entire light emitting surface, thereby ensuring uniformity of luminance over the entire indicator needle light emitting surface.

In the electrically illuminating indicator needle 1 of the first embodiment described above, the light reflecting surface 13 is assumed to be an arc surface, although it may also be parabolic cylindrical surface, elliptic cylindrical surface, hyperbolic cylindrical surface or other curved surface, which may be selected in accordance to the directivity characteristic of the light emitting diode.

In case the light reflecting surface 13 is a parabolic surface, for example, entire light incident on the light reflecting surface can be reflected as a parallel beam by disposing the light emitting diode so that the light emitting point of the light emitting diode is positioned at the focal point of the parabolic surface. Therefore, such a design as light emitted by the light emitting diode does not directly emerge from the light emitting surface allows only the reflected light to emerge uniformly from the light emitting surface, so as to suppress the luminance from being unevenly distributed.

In case the light reflecting surface 13 is a hyperbolic surface, light reflected on the light reflecting surface is caused to diverge by disposing the light emitting diode at the focal point of the hyperbolic surface. This phenomenon can be used to suppress the luminance from being unevenly distributed over the light emitting surface.

Further in case the light reflecting surface is an elliptic surface, with such a constitution as the light emitting diode is placed at one of focal points of the elliptic surface, every light ray reflected on the light reflecting surface is caused to pass the other focal point. Thus, light can be diffused uniformly over the light emitting surface by placing a light diffusing member at the other focal point than the one where the light emitting diode is positioned. It is also made possible to utilize a wavelength conversion material more efficiently by placing the wavelength conversion material at the other focal point than the one where the light emitting diode is positioned.

SECOND EMBODIMENT

Figure 4:
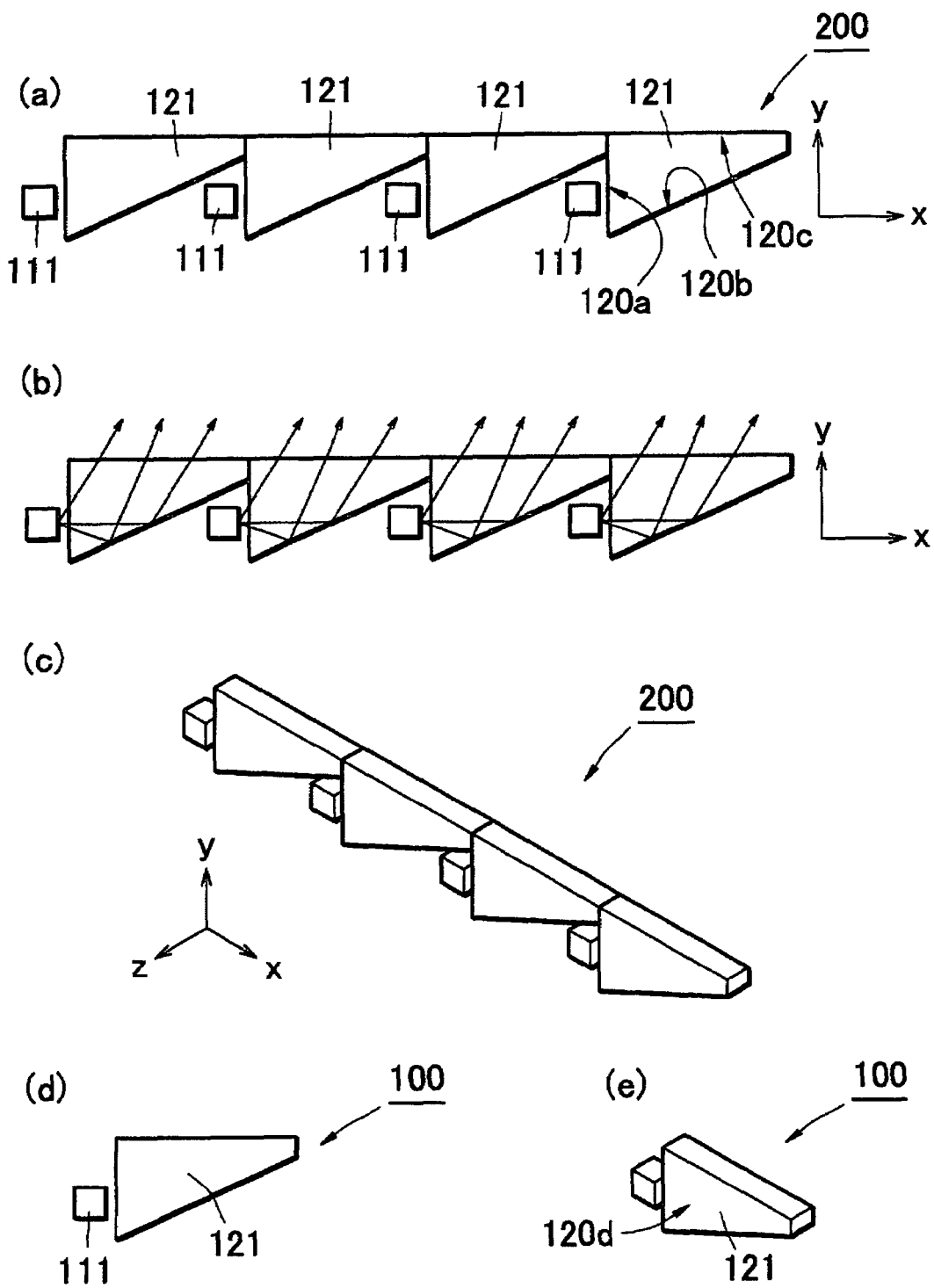
FIG. 4 shows side views ((a) and (b)) and a perspective view (c) of the constitution of the electrically illuminating indicator needle 1 according to second embodiment of the present invention, with (d) and (e) being side view and perspective view, respectively, of unit light emitting portion.

An electrically illuminating indicator needle according to the second embodiment of the present invention will be described by making reference to FIG. 4 and FIG. 5.

FIG. 4(a) is a schematic side view of an electrically illuminating indicator needle 200 according to the second embodiment. In the second embodiment, a pair of light emitting diode 111 and unit light guiding member 121 constitute a unit light emitting portion 100, and a plurality of the unit light emitting portions disposed in line along x axis constitute an electrically illuminating indicator needle |200|. The electrically illuminating indicator needle 200 is constituted from four unit light emitting portions 100 as shown in FIG. 1(a), where reference numeral 120a denotes a plane of incidence, 120b denotes a light reflecting surface and 120c denotes a light emitting surface. Reference numeral 111 denotes the light emitting diode.

That is, in the electrically illuminating indicator needle 200 of the second embodiment, a plurality of unit light guiding members 121 disposed in line constitute the indicator needle light guiding member, and a plurality of the light emitting surfaces 120c disposed in line constitute the indicator needle light emitting surface.

FIG. 4(b) is a schematic side view of the electrically illuminating indicator needle 200 according to the second embodiment in the state of emitting light. An arrow indicates the optical path from the light emitting diode.

FIG. 4(c) is a schematic perspective view of the electrically illuminating indicator needle 200 according to the second embodiment.

FIG. 4(d) is a side view of the unit light emitting portion 100 and FIG. 4(e) is a perspective view of the unit light emitting portion 100.

FIG. 4(a) shows the unit light emitting portion 100 of FIG. 4(d) being disposed in line. The unit light guiding members 121 of the unit light emitting portion 100 adjacent to each other may be disposed in physical contact with each other as shown in FIG. 4(a) or may be separated from each other.

When the unit light guiding members are connected with each other via an opaque material interposed therebetween, light emitted by one of the unit light emitting portions 100 can be prevented from emerging from the light emitting surface of the adjacent unit light emitting portion 100, thereby improving the visibility when, for example, light is emitted from the inner portion sequentially. That is, the constitution in which the unit light guiding members are disposed with via the opaque material interposed therebetween makes it possible to prevent light from entering the adjacent unit light emitting portion, thereby providing dynamically changing light during sequential lighting operation.

In the second embodiment, the light reflecting surface 120b is formed in a flat surface, not the arc surface as in the first embodiment, and the size of the light reflecting surface 120b, angle thereof with respect to the plane of incidence 120a and the position of the light reflecting surface 120b relative to the light emitting diode are set so as to achieve substantially uniform luminance distribution of light emission of the unit light emitting surface 121, by taking the directivity of light emission from the light emitting diode 2 and the position of the light reflecting surface 120b relative to the light emitting diode into consideration.

When the light emitting diode 111 is disposed for each of the unit light guiding members 121 constituted as described above so that the light emitting surface of the light emitting diode 111 faces the plane of incidence 111 of the unit light guiding member 121, light that has been emitted by the light emitting diode 111 and introduced through the plane of incidence 120a into the unit light guiding member 121 emerges, after being reflected on the light reflecting surface 13, while diffusing over the entire light emitting surface 11.

The electrically illuminating indicator needle 200 of the second embodiment constituted as described above achieves substantially uniform luminance distribution of light emission of the unit light emitting surface 121 with relatively simple constitution.

THIRD EMBODIMENT

Figure 6:
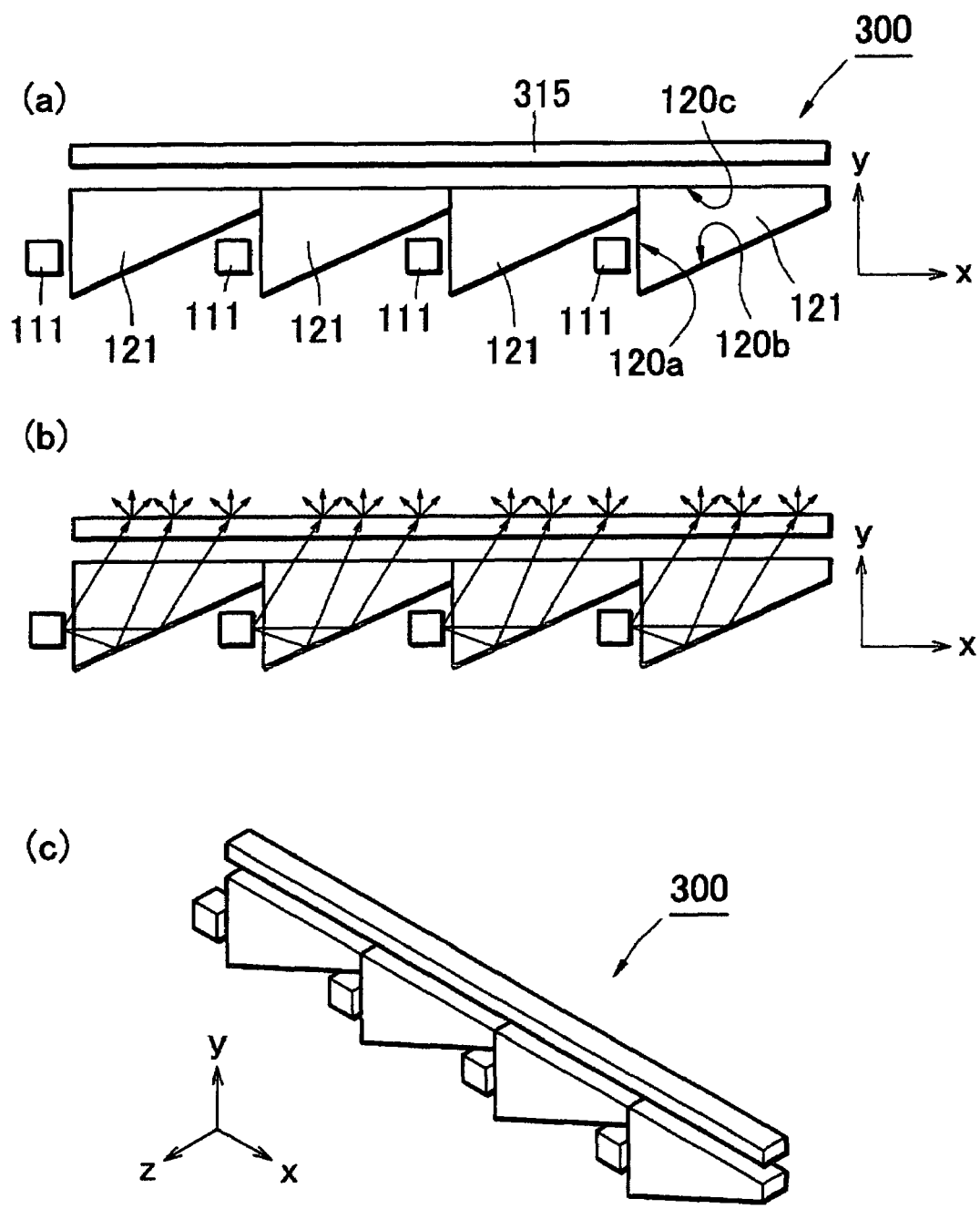
FIG. 6 shows side views ((a) and (b)) and a perspective view (c) of the constitution of the electrically illuminating indicator needle 1 according to third embodiment of the present invention.

FIG. 6 shows side views ((a) and (b)) and a perspective view (c) showing the electrically illuminating indicator needle 300 according to third embodiment of the present invention.

The electrically illuminating indicator needle of the third embodiment has a constitution similar to that of the second embodiment, except that a light diffusing member 315 is disposed right above the indicator needle light guiding member. In FIG. 6, members similar to those of the second embodiment are denoted with similar reference numerals, and repetitive explanation will be omitted.

In the third embodiment, the light diffusing member 315 preferably has such a size that covers the indicator needle light emitting surface of the indicator needle light guiding member when viewed in the direction of observing surface (y axis direction). That is, size in the direction of x-z plane is preferably at least the size of the indicator needle light emitting surface. Thickness of the light diffusing member 315 in y axis direction, for which there is no restriction, is set for example in a range from 10 μm to 1 mm, preferably from 50 μm to 700 μm. The lower limit is set for the preferable thickness, because a thickness less than the lower limit results in weak mechanical strength and, in case the light diffusing member is bonded to the indicator needle light guiding member via a binder, the light diffusing member may be curled due to the stress generated in the interface with the binder, thus making it difficult to handle. In case the light diffusing member is thicker than the upper limit, on the other hand, luminance decreases.

The present invention is not limited to the positional relationship between the light diffusing member 315 and the indicator needle light guiding member shown in FIG. 6. While the members are shown as separated from each other for the ease of understanding, they may be disposed in physical contact with each other. They may also be bonded with each other by using a binder or the like. Disposing these members in the state of being physically separated from each other makes it possible to provide an air layer having a low refraction index interposed therebetween, so that light undergoes multiple reflections in the interfaces between the indicator needle light emitting surface and the air layer and between the air layer and the light diffusing member, thereby decreasing the unevenness in luminance further.

On the other hand, in case the light diffusing member 315 and the indicator needle light guiding member are disposed in physical contact with each other, the light diffusing member is mechanically supported by the light guiding member so that handling of the light diffusing member becomes easier even when it is made thinner. In case the light guiding member and the light diffusing member are bonded with each other by using a binder or the like, it is made possible to enhance the diffusing effect by using a material having diffusing property for the binder. Also, when the binder is used for bonding, it is preferable to roughen the surfaces of the indicator needle light guiding member and the light diffusing member. Roughening increases the surface area and therefore increases the bonding strength. The light diffusing member can be roughened on the surface thereof by the same method of roughening the surface of the light guiding member, while etching, sand blast, sand paper or the like can be used.

The light diffusing member 315 will now be described in more detail.

The light diffusing member 315 is formed from a translucent material including a light diffusing material mixed therein. That is, the light diffusing member 315 is made by dispersing a light diffusing material in a translucent material. The translucent material may be formed from a material similar to the material of the light guiding member, such as an acrylic resin, a polycarbonate resin, an amorphous polyolefin resin, a polystyrene resin, a norbornene resin, a cycloolefin polymer (COP) or the like.

An acrylic resin has high transparency, and is therefore less likely to undergo yellowing caused by photo-deterioration. As a result, output power is less likely to decrease due to aging and, as such, the acrylic resin is preferably used in the present invention.

A polycarbonate resin excels in impact resistance, and is therefore preferably used in such an application as the present invention where the component is subjected to mechanical impact whenever in operation such as in an automobile. The light diffusing member may be either an inorganic filler or an organic filler.

For an inorganic filler, silica, aluminum hydroxide, aluminum oxide, zinc oxide, barium sulfide, magnesium silicate or a mixture thereof may be used. For an organic filler, an acrylic resin, an acrylonitrile resin, polyurethane, polyvinyl chloride, polystyrene, polyacrylonitrile, polyamide (nylon) or the like may be used.

While there is no limitation on the shape of the light diffusing member, such shapes as spherical shape, cubic shape, ancillary shape, rod shape, spindle shape, plate shape, scale shape, fibrous shape or the like may be used, among which spherical beads having high light diffusing property are preferably used.

A particle size of the light diffusing material is from 3 μm to 25 μm, preferably from 5 μm to 20 μm, and more preferably from 8 μm to 15 μm. The smaller the particle size of the light diffusing material, the higher the light diffusing effect, while the larger the particle size of the light diffusing material, the higher the impact resistance of the light diffusing material. When this trade-off is taken into consideration, the particle size is preferably within the range described above.

FOURTH EMBODIMENT

Figure 7:
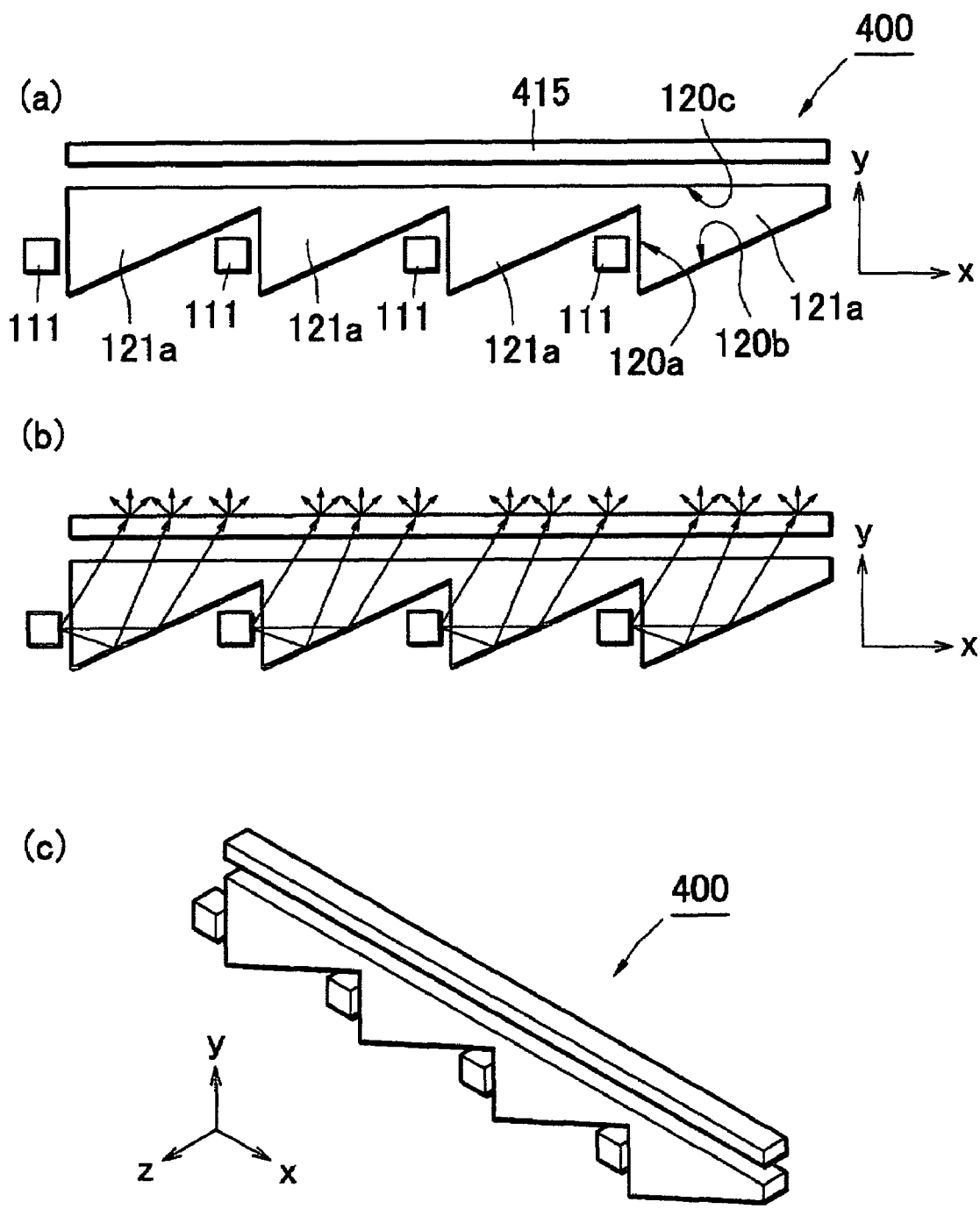
FIG. 7 shows side views ((a) and (b)) and a perspective view (c) of the constitution of the electrically illuminating indicator needle 1 according to fourth embodiment of the present invention.

FIG. 7 shows the electrically illuminating indicator needle 400 according to fourth embodiment of the present invention. The electrically illuminating indicator needle 400 of the fourth embodiment has a constitution similar to that of the third embodiment, except that the indicator needle light guiding member is formed in an integral piece by molding a plurality of unit light guiding portions 121a having the function similar to that of the unit light guiding member 121.

The plane of incidence, the light reflecting surface and the light emitting surface of the unit light guiding portion 121a are formed similarly to those of the unit light guiding member 121, and therefore the plane of incidence, the light reflecting surface and the light emitting surface of FIG. 7 are denoted by reference numerals similar to those shown in FIG. 6.

The light diffusing member denoted by reference numeral 415 is constituted similarly to the light diffusing member 315 of the third embodiment.

The electrically illuminating indicator needle 400 of the fourth embodiment constituted as described above has similar effects as the third embodiment and has the light guiding member formed integrally therewith, and is therefore easy to handle. Moreover, since it is not necessary to bond the light guiding members, that constitute the unit light emitting portion, to each other, the light guiding member can be made thinner.

Preferable constitutions of the constituent members of the first through fourth embodiments and a variation thereof will now be described.

(Light Emitting Diode)

The light emitting diode is constituted from a light emitting element mounted in a package or on a substrate and is molded in a resin for sealing.

The light emitting element is made by forming a light emitting layer from a semiconductor such as GaAlN, ZnO, ZnS, ZnSe, SiC, GaP, GaAlAs, AlN, AlInGaP, InGaN, GaN, AlInGaN or the like on a substrate.

According to the present invention, light emitting diodes of different type and light color of the light emission may be used for different unit light emitting portions. A light emitting diode including a wavelength conversion material may also be used so as to differentiate the color of light emitted from different unit light emitting portions through the combination of the light emitting element and the wavelength conversion material.

The wavelength conversion material is typically a fluorescent material. Higher efficiency of light emission of a fluorescent material is obtained from one that absorbs light from the light emitting element and emits light of longer wavelength. The particle size of the fluorescent material is preferably in a range from 2 μm to 50 μm, and more preferably from 5 μm to 30 μm. A fluorescent material having such a particle size has high light absorptivity and wavelength conversion efficiency and can be excited by light over a broader range of wavelengths. A fluorescent material having particle size smaller than 2 μm can relatively easily form a coagulant so as to sediment as a dense lumps in a liquid resin, thus resulting in lower light permeability, lower light absorptivity and lower wavelength conversion efficiency, and can be excited by light only in a narrow range of wavelengths. An organic fluorescent material having high wavelength conversion efficiency is preferably used in a portion that is not affected by heat.

Figure 8:
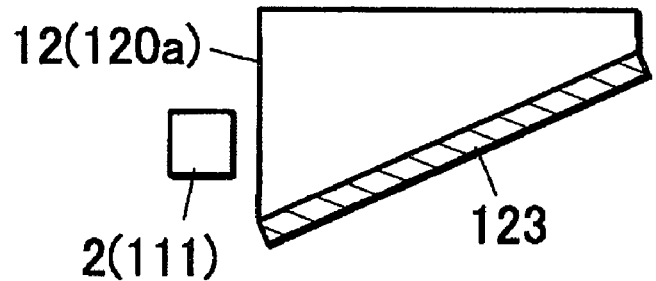
FIG. 8 shows side views showing the constitution of light reflecting surface (a) and plane of incidence ((b) and (c)) of electrically illuminating indicator needle according to a variation of the present invention.
Figure 8:
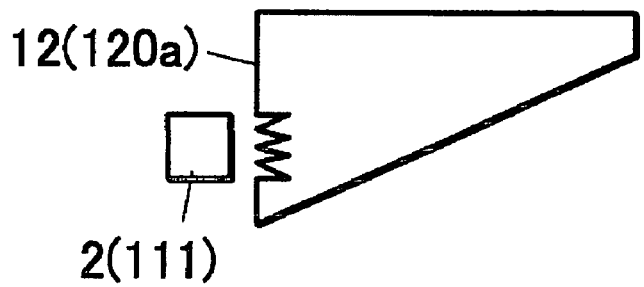
Figure 8:
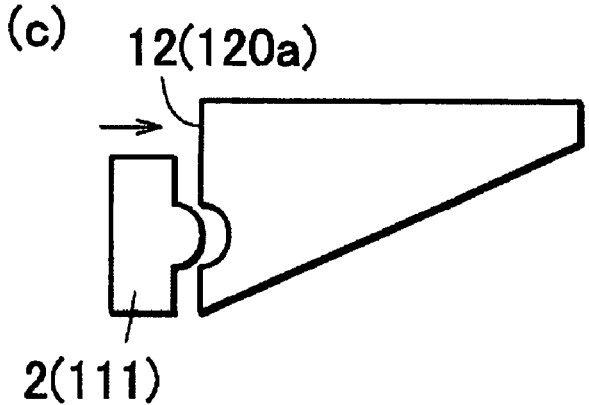

FIGS. 8(*a*), (*b*), (*c*), (*d*) show variations of the unit light guiding member (unit light guiding portion) in the first through fourth embodiments, respectively. While the light reflecting surface is shown as a flat surface in FIG. 8, it may also be a curved surface as in the case of the first embodiment.

According to the present invention, efficiency of reflection can be improved and luminance can be improved, by disposing a reflection enhancing member 123 on the light reflecting surface.

Also, in the present invention, the reflection enhancing agent may be disposed so as to cover the side face of the unit light guiding member (indicator needle light guiding member), which makes it possible to suppress radiation loss from the side face and improve the luminance.

The reflection enhancing member may be formed from a white-paint (such as barium sulfide), white plating (such as white anodized aluminum), white sheet (such as polypropylene) or the like. Metals such as Ag, Al, Ni, Au or Cu, or metal oxide film such as. $SiO_2/ZrO_2$ or $SiO_2/TiO_2$ may also be used.

In case a white paint, a white plating, a white sheet or a metal is used, it preferably has a thickness that does not transmit light, since it is not dependent on the wavelength of light emitted by the light emitting diode. Among metals, Ag having higher reflectivity or Al having high durability is preferably used.

In case the reflection enhancing member 123 is formed from a plurality of metal oxide films stacked one on another, reflectivity of the reflection enhancing member has wavelength dependency. The wavelength dependency is related to the thickness of the oxide film. In case an oxide film having high refractivity index and an oxide film having low refractivity index are stacked one on another, thickness of each oxide film must satisfy the relationship of $\lambda/4n$, where $\lambda$ is the wavelength and n is the refractive index.

Further, the light reflecting surface is preferably mirror-finished in order to achieve a high reflectivity, regardless of whether it is formed in flat surface or a curved surface. Mirror-finishing the surface enables it to suppress the loss caused by light transmission through the light reflecting surface and improve the efficiency of extracting light from the light emitting surface. It is more preferable to form the reflection enhancing member on the mirror-finished light reflecting surface, which enables it to further improve the efficiency of extracting light from the light emitting surface.

While the plane of incidence 12, 120*a* may be a flat surface, it is preferable to process the surface opposed to the light emitting diode so as to form prisms therein as shown in FIG. 8(*b*), which enables it to expand the incident light into y axis direction and improve the luminance on the side of the light emitting surface that is nearer to the plane of incidence. By processing the plane of incidence 12, 120*a* to form prisms, it is made possible to control the spread of light beam after entering the unit light guiding member (unit light emitting portion) by the shape of the prism, thereby suppressing unevenness in luminance more effectively.

Further according to the present invention, a light emitting diode having a lens as shown in FIG. 8(*c*) may also be used, which enables it to expand the incident light into y axis direction similarly to the case shown in FIG. 8(*b*), by forming a recess which has a shape matching the lens shape in the surface opposed to the light emitting diode.

Moreover, roughening the light emitting surface makes it possible to suppress total reflection on the light emitting surface, so as to improve the efficiency of extracting light from the light emitting surface, and causing the light guiding member to perform the function of light diffusion member at the same time. The surface can be roughened by etching, sand blast, sand paper or the like.

The light guiding member may be formed from such materials as an acrylic resin, a polycarbonate resin, an amorphous polyolefin resin, a polystyrene resin, a norbornene resin, a cycloolefin polymer (COP) and the like.

Among these materials, an acrylic resin has high transparency, and is therefore less likely to undergo yellowing caused by photo-deterioration. As a result, output power is less likely to decrease due to aging, and an acrylic resin is preferably used for the light guiding member in the present invention.

A polycarbonate resin excels in impact resistance, and is therefore preferably used in such an application as the present invention where the component is subjected to mechanical impact whenever in operation such as automobile.

Furthermore, the light guiding member may include a wavelength conversion material so as to obtain light emission of a desired color. When the wavelength conversion material is included in the light guiding member, it is less likely to undergo photo deterioration because it is located at a greater distance from the light emitting diode that generates heat, than in the case of placing the wavelength conversion material in the resin that forms the light emitting diode. Thus, it is made possible to use an organic fluorescent material that has higher efficiency of wavelength conversion, as well as inorganic fluorescent material. The wavelength conversion material included in the light guiding member may be either distributed throughout the light guiding member, concentrated in a portion of the plane of incidence proximate to the light emitting diode, or disposed near the light emitting surface of the light guiding member. By changing the position of disposing the wavelength conversion material, it is made possible to differentiate the light emission distribution through color blending of light emitted by the light emitting diode and light emitted by the wavelength conversion material in the light emitting surface by changing the position of disposing the wavelength conversion material.

The light guiding member may be formed by either injection molding or cutting off a mother material of the light guiding member.

When injection molding is employed, the light emitting surface can be roughened by processing the surface of the mold corresponding to the light emitting surface by sand-blasting or the like.

When the light guiding member is cut off from a mother material of the light guiding member, different surface conditions can be obtained by using different tools when cutting on the light emitting surface side and cutting the light reflecting surface side. For example, rough light emitting surface and mirror-finished light reflecting surface can be obtained by using a coarse saw when cutting on the light emitting surface side and using a fine saw when cutting the light reflecting surface side.

Examples of circuits that control the electrically illuminating indicator needle according to the first through fourth embodiments will now be described.

Figure 5:
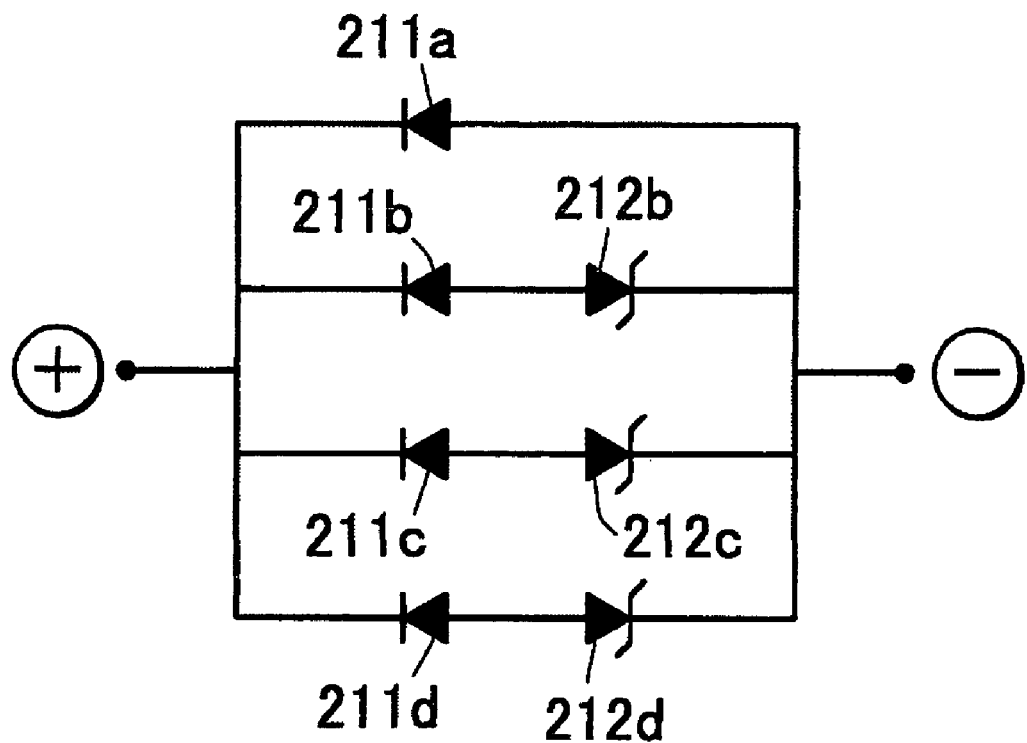
FIG. 5 is a circuit diagram showing an example of circuit constitution that successively lights up the electrically illuminating indicator needle according to the embodiment of the present invention.

While the electrically illuminating indicator needle of the first through fourth embodiments may be controlled to light up sequentially by computer control, simple voltage control may be employed for this purpose by mounting zener element on the circuit substrate, as illustrated by the diagram of principle of operation in FIG. 5.

In the circuit shown in FIG. 5, the light emitting diodes 211a, 211b, 211c and 211d are connected in parallel, and zener diodes 212b, 212c and 212d are connected in series with the light emitting diodes 211b, 211c and 211d, respectively, in series. Operating voltages of the zener diodes 212b, 212c and 212d are set to increase in this order. When a voltage is applied to this circuit, the light emitting diode 211a which is not connected to the zener diode lights up first, followed by the light emitting diodes 211b, 211c and 211d lighting up successively.

The sequential lighting circuit described above is very simple in constitution and can be made in small construction, and can therefore be constituted on the substrate 3 shown in FIG. 1.

INDUSTRIAL APPLICABILITY

The present invention can be applied to the indicator needle of speedometer and tachometer of automobiles and various indicators provided in a cockpit.

The invention claimed is:

1. An electrically illuminating indicator needle comprising:
   a light guiding member having a plurality of light incidence faces, a plurality of light reflecting faces, each of which is disposed to correspond one to one with the light incidence faces so as to reflect a light coming from the corresponding light incidence face, a plurality of light emitting faces, each of which is disposed to correspond one to one with the light reflecting faces so as to emit the light reflected on the corresponding light reflecting face;
   a substrate having first and second principal surfaces which are opposed to each other, the substrate being disposed so that the first principal surface is in contact with a side face of the light guiding member; and
   a plurality of light emitting diodes which are arranged on the first principal surface of the substrate so that each of the light emitting diodes is disposed to correspond one to one with the light incidence faces.

2. The electrically illuminating indicator needle according to claim 1, wherein each of the light reflecting faces is formed as a curved surface.

3. The electrically illuminating indicator needle according to claim 1, wherein the light emitting faces are arranged in line.

4. The electrically illuminating indicator needle according to claim 1, wherein each of the light incidence faces is perpendicular to the corresponding light emitting face.

5. The electrically illuminating indicator needle according to claim 1, wherein the light incidence faces are parallel with each other.

6. The electrically illuminating indicator needle according to claim 1, wherein the light guiding member is an integral molding body having said light incidence faces, said light reflecting faces and said light emitting faces.

7. The electrically illuminating indicator needle according to claim 1, wherein the light guiding member is formed by disposing a plurality of separated light guiding members in line, each of said separated light guiding members having one of the light incidence faces, one of the light reflecting faces and one of the light emitting faces.

8. The electrically illuminating indicator needle according to claim 1, wherein each of the light emitting faces is a rough face.

9. The electrically illuminating indicator needle according to claim 1, wherein each of the light reflecting faces is a mirror face.

10. The electrically illuminating indicator needle according to claim 1, wherein the lights emitting from the light emitting faces have different wavelength each other.

11. The electrically illuminating indicator needle according to claim 1, wherein the light guiding member or the light emitting diodes have a wavelength conversion material.

12. The electrically illuminating indicator needle according to claim 1, further comprising a diffusing member, wherein the lights emitted from the light emitting faces are emerged through the diffusing member.

13. A light guiding member comprising:
   a plurality of light incidence faces, each of which is disposed for receiving light incident upon the light incidence face from a light source that confronts the light incidence face;
   a plurality of light reflecting faces, each of which is disposed to correspond one to one with the light incidence faces so as to reflect a light coming from the corresponding light incidence face;
   a plurality of emitting regions each of which is disposed to correspond one to one with the light reflecting faces so as to emit the light reflected on the corresponding light reflecting face,
   wherein the emitting regions are disposed in line to form an indicator needle light emitting face.

14. The light guiding member according to claim 13, wherein each of the light reflecting faces is formed as a curved surface.

15. The light guiding member according to claim 13, wherein each of the light incidence faces is perpendicular to the indicator needle light emitting face.

16. The light guiding member according to claim 13, wherein the light incidence faces are parallel with each other.

17. The light guiding member according to claim 13, wherein the light guiding member is an integral molding body having said light incidence faces, said light reflecting faces and said light emitting faces.

18. The light guiding member according to claim 13, wherein the light guiding member is formed by disposing a plurality of separated light guiding members in line, each of said separated light guiding members having one of the light incidence faces, one of the light reflecting faces and one of the light emitting faces.

19. The light guiding member according to claim 13, wherein the indicator needle light emitting face is a rough face.

* * * * *

UNITED STATES PATENT AND TRADEMARK OFFICE
CERTIFICATE OF CORRECTION

| | | |
|---|---|---|
| PATENT NO. | : 7,721,672 B2 | |
| APPLICATION NO. | : 11/918866 | |
| DATED | : May 25, 2010 | |
| INVENTOR(S) | : Koji Nakano et al. | |

It is certified that error appears in the above-identified patent and that said Letters Patent is hereby corrected as shown below:

ON THE TITLE PAGE:

Correct item (86) as follows:

-- (86) PCT No.:     PCT/JP2006/308061

§ 371(c)(1),
        (2), (4) Date:   Jan. 18, 2008 --.

Signed and Sealed this
Twenty-second Day of February, 2011

David J. Kappos
*Director of the United States Patent and Trademark Office*